US008683516B2

(12) United States Patent
Benyamin

(10) Patent No.: US 8,683,516 B2
(45) Date of Patent: Mar. 25, 2014

(54) SYSTEM AND METHOD FOR PLAYING MEDIA OBTAINED VIA THE INTERNET ON A TELEVISION

(76) Inventor: Daniel Benyamin, Los Angeles, CA (US)

(*) Notice: Subject to any disclaimer, the term of this patent is extended or adjusted under 35 U.S.C. 154(b) by 934 days.

(21) Appl. No.: 12/368,145

(22) Filed: Feb. 9, 2009

(65) Prior Publication Data

US 2009/0205003 A1   Aug. 13, 2009

Related U.S. Application Data

(60) Provisional application No. 61/027,127, filed on Feb. 8, 2008.

(51) Int. Cl.
*H04N 5/445* (2011.01)
*H04N 7/173* (2011.01)
*G06F 3/00* (2006.01)
*G06F 13/00* (2006.01)
*G06F 7/00* (2006.01)
*G06F 17/30* (2006.01)

(52) U.S. Cl.
USPC .............. 725/38; 725/133; 707/705; 707/791; 707/805

(58) Field of Classification Search
None
See application file for complete search history.

(56) References Cited

U.S. PATENT DOCUMENTS

| 8,117,185 | B2* | 2/2012 | Franks et al. | 707/713 |
| 2006/0026496 | A1* | 2/2006 | Joshi et al. | 715/500.1 |
| 2007/0250864 | A1* | 10/2007 | Diaz Perez | 725/52 |
| 2008/0059452 | A1* | 3/2008 | Frank | 707/5 |
| 2008/0162573 | A1* | 7/2008 | Eyal | 707/104.1 |
| 2008/0228675 | A1* | 9/2008 | Duffy et al. | 706/10 |

* cited by examiner

*Primary Examiner* — Ricky Chin
(74) *Attorney, Agent, or Firm* — KPPB LLP

(57) ABSTRACT

Systems for browsing media that is accessible via the Internet are described. In many embodiments, the system includes a browsing application that identifies media within pages retrieved via the Internet by performing document analysis. The document analysis identifies pieces of media referenced by the page and, in a number of embodiments, also identifies pieces of media referenced by pages linked to by the original page. The identified pieces of media can be used to generate playlists that can then be played for a user via a television. In several embodiments, the browsing application is configured to render a playback page that shows pieces of media queued in a playlist and facilitates user navigation to other sites using a typical television remote control.

17 Claims, 11 Drawing Sheets

SYSTEM AND METHOD FOR PLAYING MEDIA OBTAINED VIA THE INTERNET ON A TELEVISION

CROSS-REFERENCE TO RELATED APPLICATION

The present application claims priority to U.S. Provisional Patent Application Ser. No. 61/027,127 entitled "System and Method for Playing Media Obtained via the Internet on a Television", filed Feb. 8, 2008, the disclosure of which is incorporated by reference herein in its entirety.

BACKGROUND

The present invention relates generally to playing media via a television and more specifically to playing media obtained via the Internet on a television.

Analog and/or digital signals can be used to play media via a television. Media information used to generate the analog and digital signals can be obtained via any of a variety of sources. Media can be obtained from a broadcast source such as terrestrial broadcast television, cable television, and satellite television. Media can also be obtained from a fixed media such as digital versatile disks (DVDs), on demand via a local network, such as media obtained from a home media server, via a closed network, such as a cable or satellite network, or via the Internet.

A problem commonly encountered when attempting to display media obtained from the Internet is that the media is difficult to access via a typical television remote control. A number of services offer the ability to view media, which has been syndicated by the service, on a television. However, these services typically do not enable a user to access media via the Internet that has not been syndicated. Other systems circumvent the issues associated with viewing media via the Internet by downloading the media to a local storage device and enabling a user to access the locally stored media files using a locally generated user interface.

Really Simple Syndication (RSS) is a technology that is used by many media distribution sites to provide media to subscribers. An RSS subscription is a way for a user to "subscribe" to a site on the Internet that frequently updates content. The RSS file contains a summary of content and an RSS reader fetches RSS files from predefined locations on a periodic basis and provides the subscriber with information concerning "new" content. RSS feeds, however, usually only summarize the content of a single web site and do not give the user freedom to "browse" from page to page. For example, a subscriber to an RSS feed can see new music videos added to a site by a favorite band. However, the subscriber cannot view all of the music videos on the site attributed to the band.

A CSS can be used to describe the visual layout of information in a structured document. The separation of content from presentation enables a CSS to define the presentation of the content in various contexts. For example, different displays can be used for computers and televisions. CSSs are currently supported by a large number of websites, however, very few of these sites utilize CSSs to format information for display on alternate display devices.

SUMMARY OF THE INVENTION

Systems and methods are described for browsing sites containing media and playing media over the Internet. In a number of embodiments, a browsing application obtains information concerning media embedded in a page and generates a playlist using the media. In several embodiments, the system is capable of generating a guide page that displays playlist information. In many embodiments, the browsing application provides the ability to skip between media in the playlist and to browse to other sites to access additional media content.

One embodiment of the invention includes a server connected to a network, where the server hosts at least one page of information including embedded media, and a computing device connected to the network and to a display device, where the display device is configured to receive instructions from a remote control device. In addition, a browser application configures the computing device to retrieve a page hosted on the server, the browsing application further configures the computing device to perform page analysis, where page analysis includes identifying hyperlinks within the page, inspecting the hyperlinks to identify embedded media, and adding the embedded media to a playlist, and the browsing application further configures the computing device to generate a playback guide user interface in which the playlist of media is displayed, and to display the generated playback guide via the display device.

In a further embodiment, page analysis includes generating a tree graph of key markup elements present on the page, determining areas of interest and static information and adding the areas of interest and static information to the tree graph, analyzing the graph tree to locate static information and areas of interest that share a key markup element as a parent in the graph tree, grouping the static information and the area of interest as a program element, adding each program element to a playlist.

In another embodiment, page analysis further includes analyzing the tree graph to identify a key markup element that is a parent of a number of program elements, and assigning the identified key markup elements as a channel element and adding the program elements to a playlist associated with the channel element.

In a still further embodiment, the browsing application further configures the computing device to generate a playback guide user interface displaying the playlist and the option to display the playlist associated with the channel element.

In still another embodiment, the media objects are inserted in the play list in the order in which they appear in the page.

In a yet further embodiment, key markup elements include "div" elements in a CSS.

In yet another embodiment, key markup elements include "table" elements in an HTML page.

In a further embodiment again, an area of interest includes embedded media.

In another embodiment again, an area of interest includes a link to a page that contains embedded media.

In a further additional embodiment, static information includes text.

In another additional embodiment, static information includes an image.

In a still yet further embodiment, the computing device is a personal computer.

In still yet another embodiment, the computing device is a set top box.

In a still further embodiment again, the computing device is embedded within the display device.

In still another embodiment again, the browsing application further configures the computing device to update the playback guide user interface in response to navigation instructions received from the remote control and forwarded to the computing device by the display device.

In a still further additional embodiment, the browsing application further configures the computing device to playback media using a media player in response to navigation instructions received from the remote control and forward to the computing device by the display device.

In still another additional embodiment, the browsing application further configures the computing device to display the entire page retrieved from the server via the display device and configures the computing device to display the playback guide via the display device in response to navigation instructions received from the remote control and forwarded to the computing device by the display device.

In a yet further embodiment again, the browser application configures the computing device to retrieve multiple pages hosted on at least one server, the browsing application further configures the computing device to perform page analysis on each of the retrieved pages, where page analysis includes identifying hyperlinks within each page, inspecting the hyperlinks to identify embedded media, and adding the embedded media to a playlist, and the browsing application further configures the computing device to generate a playback guide user interface in which the playlist of media from the retrieved pages is displayed, and to display the generated playback guide via the display device.

In yet another embodiment again, the browser application selects the multiple pages to retrieve based upon hyperlinks in previously retrieved pages.

DETAILED DESCRIPTION OF THE INVENTION

Turning now to the drawings, embodiments of a system for browsing media that is accessible via the Internet is shown. In many embodiments, the system includes a browsing application that identifies media within pages retrieved via the Internet by performing document analysis. The document analysis identifies pieces of media referenced by the page and, in a number of embodiments, also identifies pieces of media referenced by pages linked to by the original page. The identified pieces of media can be used to generate playlists that can then be played for a user via a television. In several embodiments, the browsing application is configured to render a playback page that shows pieces of media queued in a playlist and facilitates user navigation to other sites using a typical television remote control.

Accessing Media Via the Internet

Figure 1:
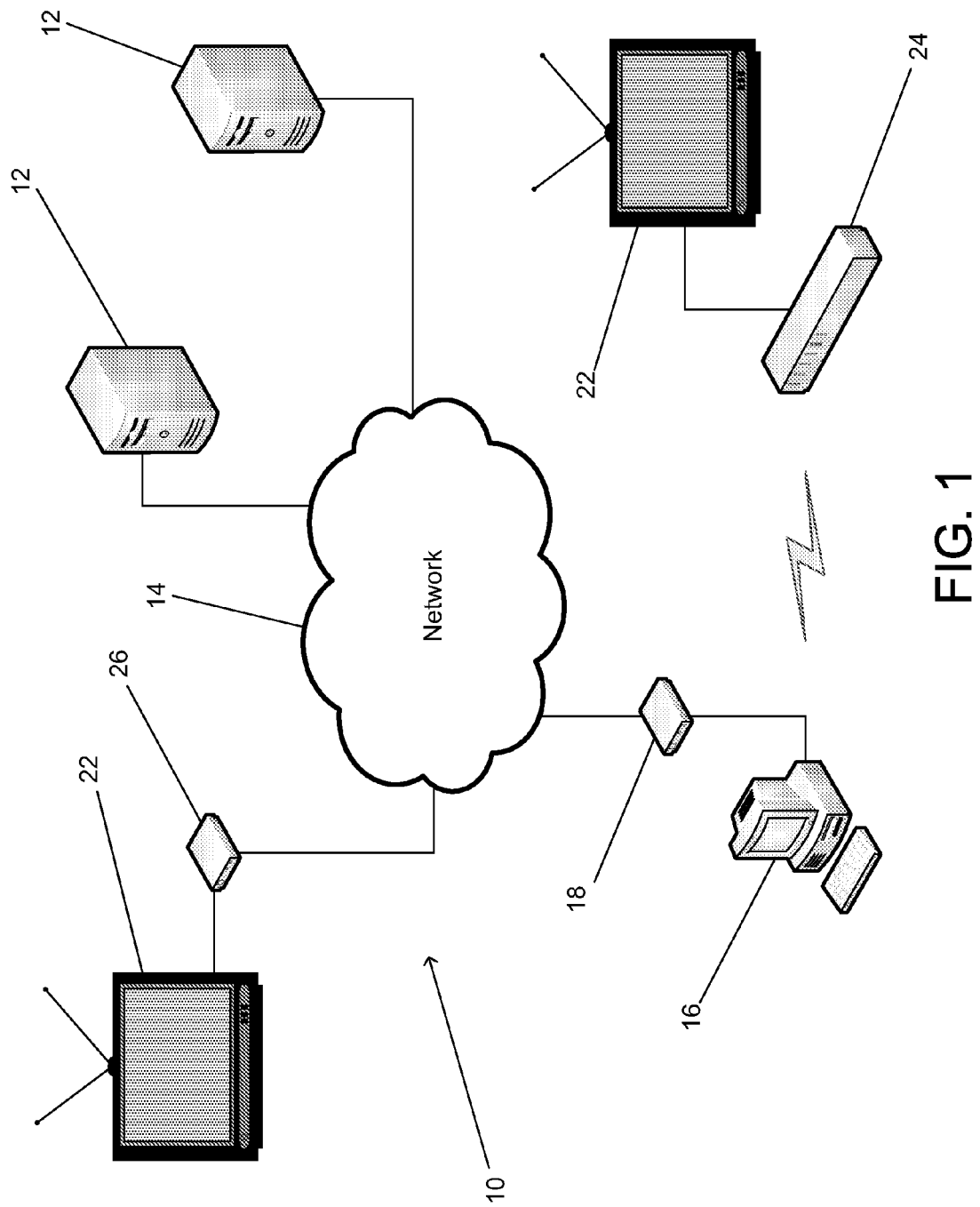
FIG. 1 is a semi-schematic diagram of a system in accordance with an embodiment of the invention for distributing media via the Internet for playing on appropriately configured televisions.

A system for accessing media via the Internet and playing the media back via a television in accordance with an embodiment of the invention is shown in FIG. 1. The system includes a number of servers 12 connected to a network 14. Although much of the following discussion describes systems where media is obtained via the Internet, media can also be accessible via a local network. A number of computing devices access media stored on the servers via the network. In the illustrated embodiment, a computer 16 communicates with the servers via a modem 18. The computer includes a browsing application that enables media retrieved from the servers to be displayed on a television 22 or another form of display or rendering device. In the illustrated embodiment, a set top box 24 handles communication with the computer 16 and playing of audio and video information via the television and/or external audio devices. The connection between the computer 16 and the set top box 24 can be wired and/or wireless. In another configuration, a television 22 that includes a built-in browser application is connected to the network. In the illustrated embodiment, the connection is via a modem 26. In other embodiments, the connection can be via a set top box that is locally connected to the network or that obtains information from the Internet via a remote cable head end.

Although specific examples of devices configured with browsing applications are discussed above, other devices that do not include a conventional keyboard and/or mouse can be configured using a browsing application in accordance with an embodiment of the invention. The browsing application can be implemented using a general computing architecture that is configured using software, and/or firmware, or the browsing application can be implemented in hardware. Characteristics of various browsing applications are discussed further below.

Browsing

Figure 2:
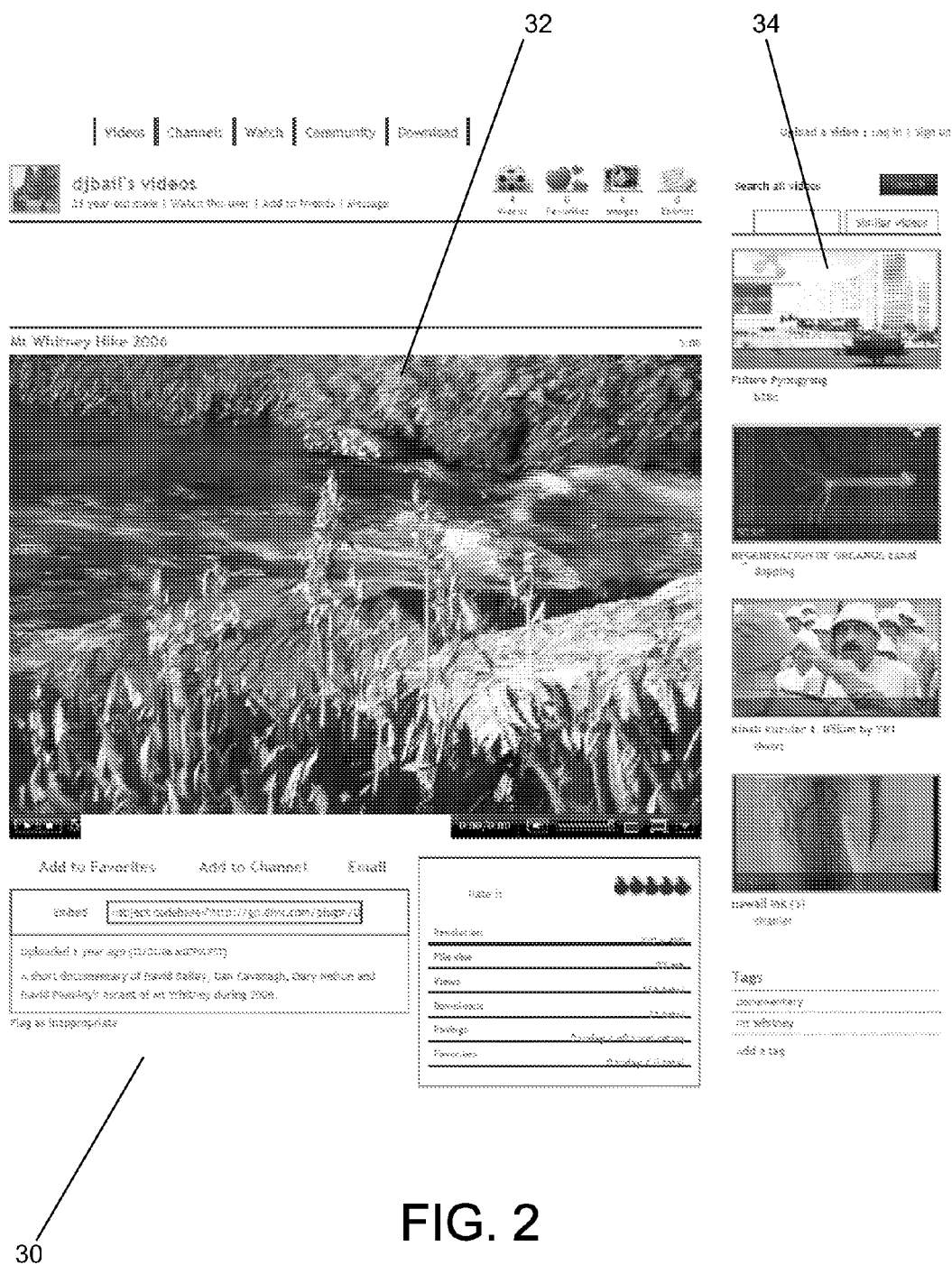
FIG. 2 is a conceptual illustration of a web page that includes a link to a multimedia file that can be played via an embedded media player and links to additional multimedia files.

Media is typically provided via the Internet in accordance with a defined presentation format. A conventional web browsing application presents a page of information to a user. The page can include embedded media playable via an embedded media player. Embedded media is a term that is typically used to describe media files referenced by a URL in a page, where a media player can use the URL to retrieve the media file and playback the media. Browsing applications in accordance with embodiments of the invention extract information from pages and reformat the information in a manner that is more readily navigable using simple user interface devices such as typical consumer electronics remote controls. A conceptual illustration of a web page including embedded video displayed by a browsing application configured in accordance with an embodiment of the invention is shown in FIG. 2. The web page 30 includes a frame 32 of an embedded multimedia sequence and frames 34 from a list of "similar" videos. When a user selects the embedded media object, the browsing application can display the embedded multimedia sequence in a full screen mode using an embedded player.

Figure 3:
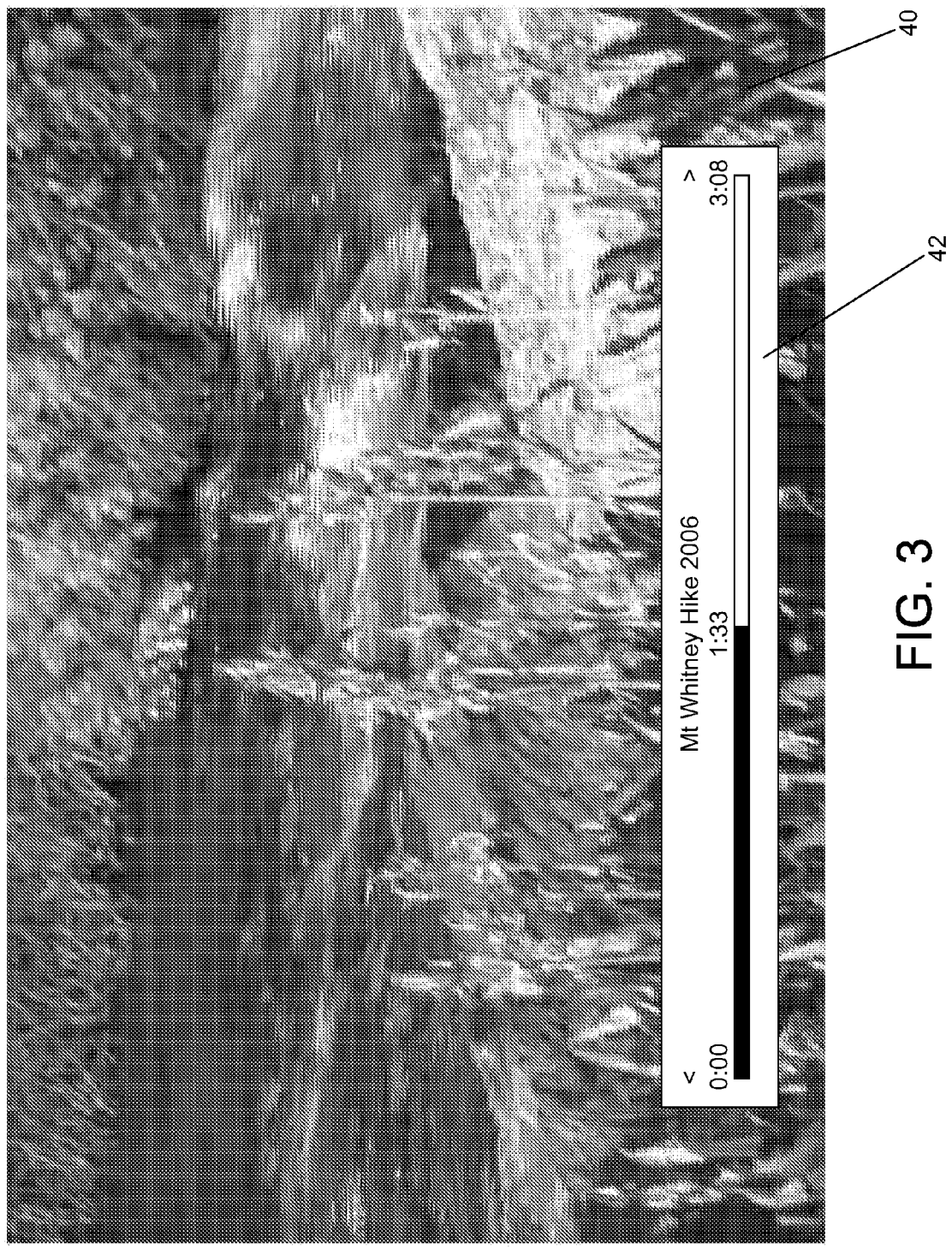
FIG. 3 is a conceptual illustration of a screen shot of the multimedia file playing on a television in accordance with an embodiment of the invention.

A conceptual illustration of a screen shot of the media sequence embedded in the web page 30 shown in FIG. 2 is illustrated in FIG. 3. Overlaid on the screenshot 40 is a an optional status box 42 that can contain information such as the name of the multimedia sequence being played, the duration, and controls allowing the user to perform functions that enable the user to navigate between different locations and/or at different speeds within the multimedia sequence (e.g. fast forward, and rewind functions) and/or skip between media sequences in a playlist of media. The generation of a playlist of media, and user interactions with media playlists are discussed further below.

A process for browsing the Internet and playing embedded media in a manner similar to that described above is shown in FIG. 4. The process 50 includes retrieving (52) a new page of information via the Internet and rendering (54) the new page. As discussed above, the rendering of the page can be performed in a manner similar to that of a conventional web browsing application. In a number of embodiments, a browsing application is used to display the page in a way that facilitates user selections of hypertext links within the page. When the page has been displayed, the system waits to receive (56) user instructions. When the process determines (58) that a received user instruction is a direction to navigate to another page, the system retrieves the page indicated by the user's selection. When the process determines (60) that a received user instruction is an instruction relating to the display of the page (e.g. scroll up, scroll down, shift between hypertext links prior to selection), the onscreen display of the page is updated (62) to reflect the user instruction. When the page contains embedded media and the process determines (60) that a received user instruction is a direction to play the embedded media, then the selected media is played (64) using an appropriate media player. In many instances the embedded media includes audio and/or video.

Figure 4:
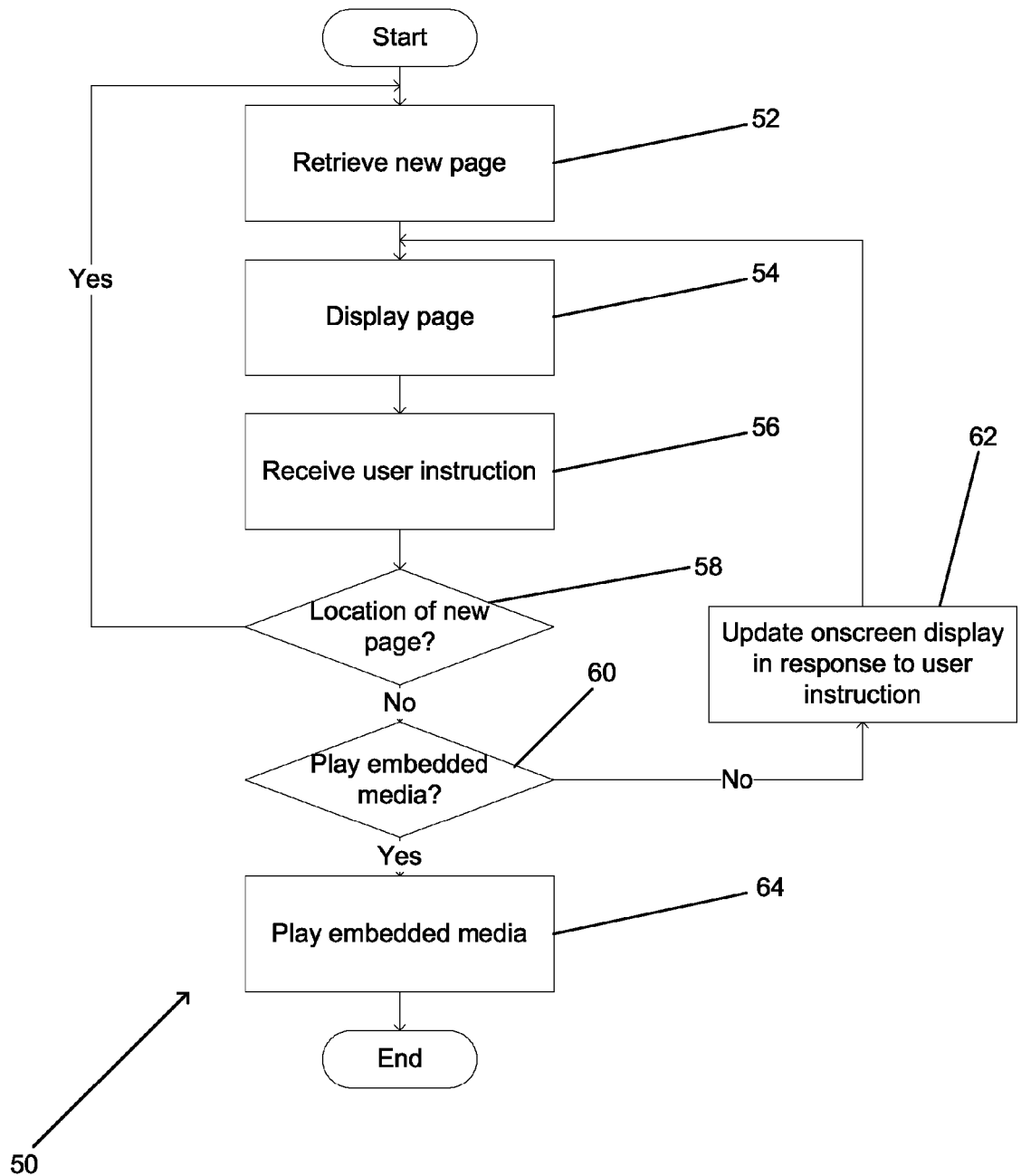
FIG. 4 is a flow chart showing a process for browsing the Internet and playing embedded media files in accordance with an embodiment of the invention.

Although a specific process is shown in FIG. 4 other processes that enable the identification of embedded media, receipt of user instructions directing the playing of embedded media and the playing of media can be implemented in accordance with embodiments of the invention.

Playlists and Playback Guides

When a user directs a browsing application in accordance with an embodiment of the invention to download a page containing embedded media, the browsing application can display the embedded media via a display that can be referred to as a playback guide. The playback guide simplifies the selection of embedded files and can display playlists derived by the browsing application. In a number of embodiments, the browsing application is only capable of displaying pages of information obtained via the Internet that include embedded media via the playback guide. In other embodiments, the user can direct the browsing application whether to display the page in the manner of a conventional browsing application or via a playback guide. In several embodiments, the playback guide is presented to the user at the user's direction and is only available once a user has commenced playing media embedded on a page.

Figure 5:
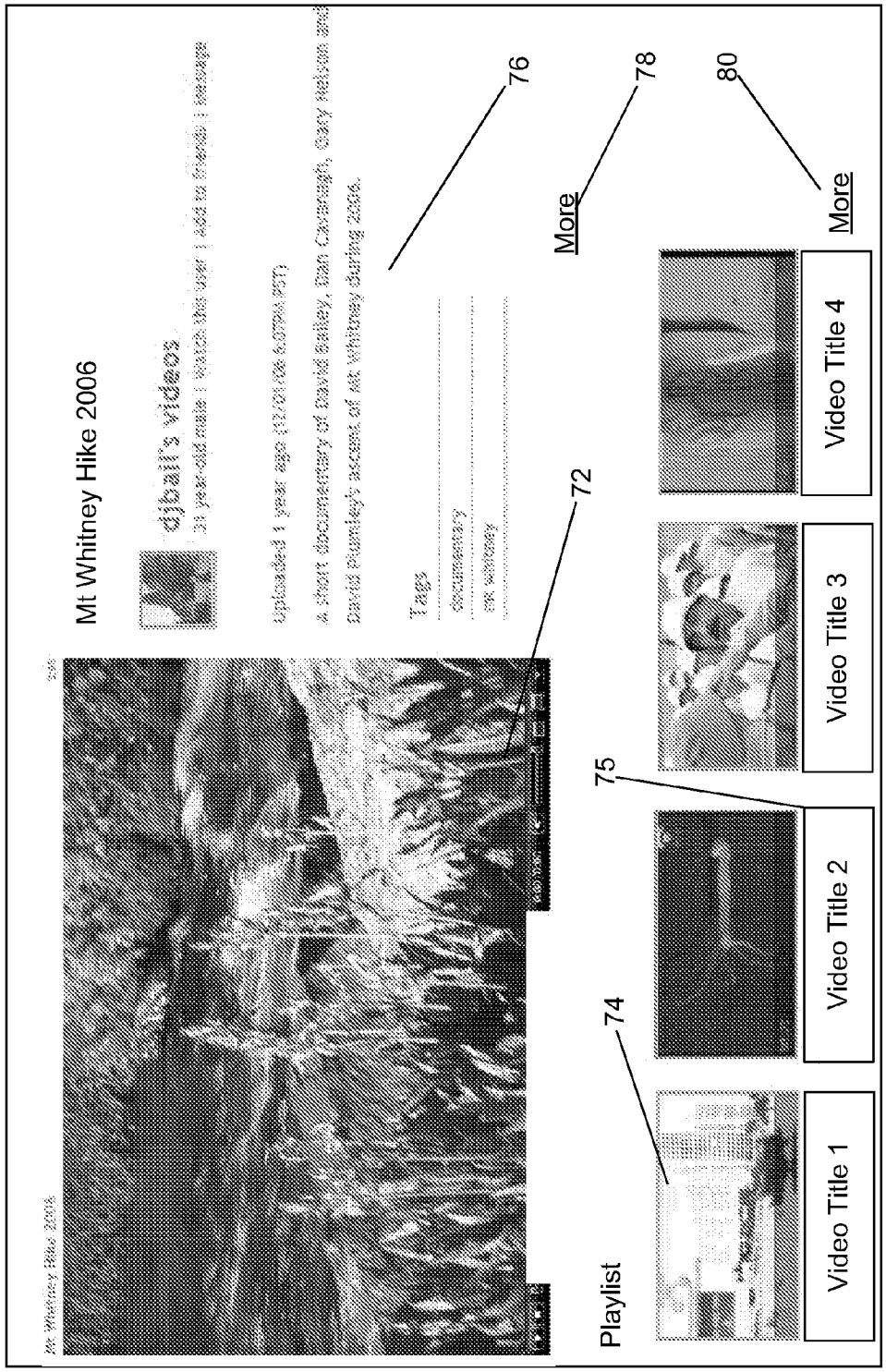
FIG. 5 is a conceptual illustration of a screen shot of a playback guide in accordance with an embodiment of the invention.

A conceptual illustration of a screen shot of a playback guide in accordance with an embodiment of the invention is shown in FIG. 5. The playback guide 70 includes the embedded media 72 currently being viewed by the user. In many embodiments, the media continues playing within the playback guide. The playback guide 70 also includes screen shots 74 taken from media contained in a media playlist and the title 75 of each piece of media. The title text is often enlarged to facilitate display on a television. The generation of a media playlist is discussed further below. Information concerning the media being played 76 is also displayed.

In operation, the user can use the playback guide to return to full screen viewing of the currently playing piece of media, can navigate to another piece of media queued up in the playlist or select a link 78 to obtain more information concerning the piece of media currently being played or select a link 80 to be provided with information concerning additional pieces of media queued in the playlist. The presentation of information in the playback guide facilitates navigation with a simple user interface device, such as a television remote control. For example, a current selection in the program guide can be indicated by highlighting the selection in the display and any of the items shown in the playback guide can rapidly be accessed via directional arrows and an enter button common on many television remote controls. Although a specific layout of information is shown in the playback guide illustrated in FIG. 5, other layouts and information can be presented to a user in a playback guide that is readily navigable using a simple user input device, such as a television remote control, in accordance with an embodiment of the invention.

Figure 6:
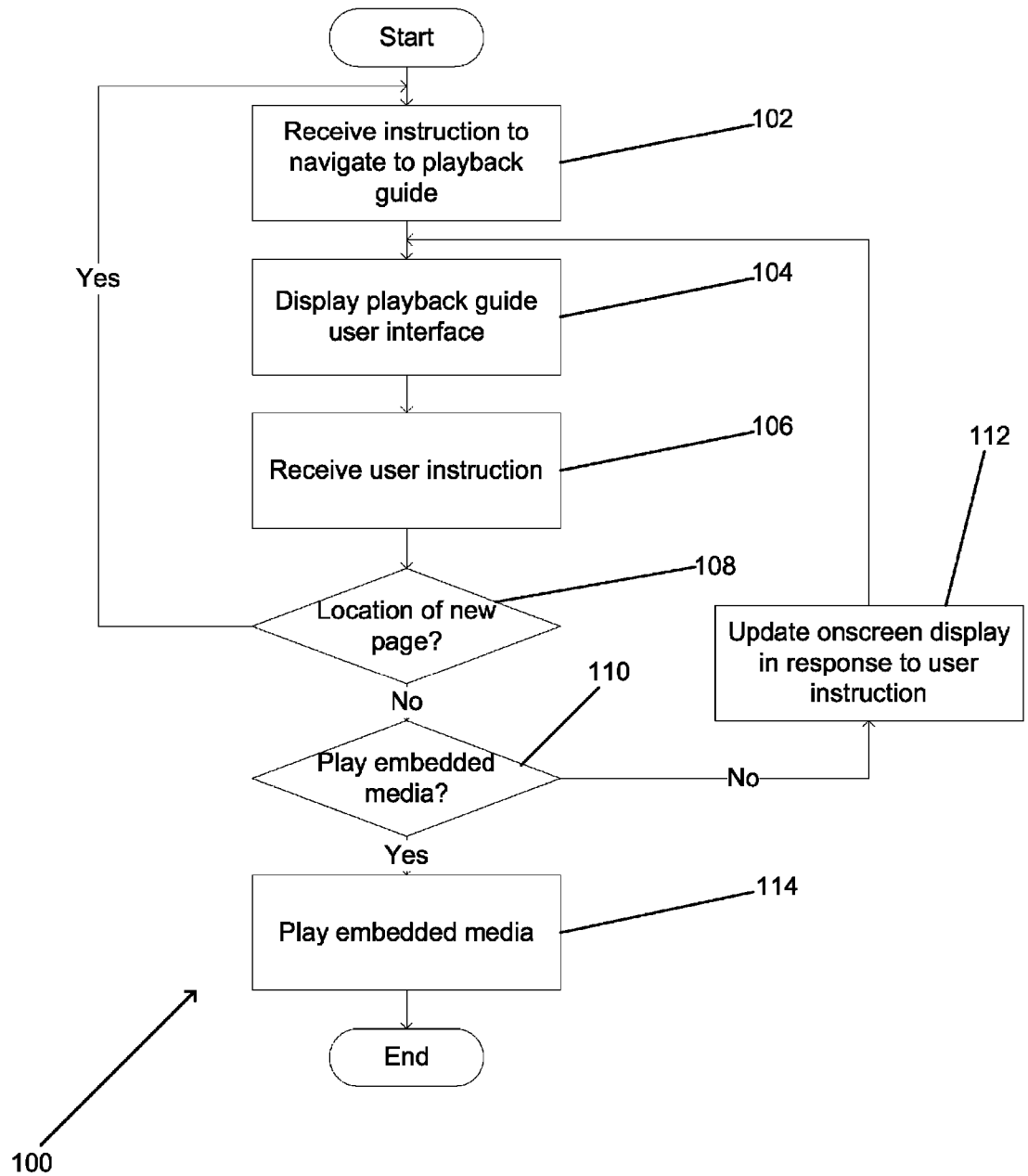
FIG. 6 is a flow chart of a process for displaying a playback guide in response to a user instruction.

A process for generating a playback guide and responding to user instructions in accordance with an embodiment of the invention is shown in FIG. 6. The process 100 includes receiving (102) an instruction to navigate to a playback guide. As discussed above, a browsing application in accordance with an embodiment of the invention can be limited to the playback guide display, can invoke the playback guide in response to a user instruction and/or can invoke the playback guide once a user has commenced playing embedded media and then provides an appropriate instruction. The process displays (104) the playback guide and waits for further instructions from the user. Once an instruction is received (106), the process determines (108) whether the instruction is the location of a new page of content. In which case, a new playback guide is generated (102). When a determination (110) is made that the instruction is to navigate within the playback guide, then the onscreen display is updated (112) in response to the user instruction and displayed (104). When a determination (110) is made that the instruction is to play a piece of embedded media, then the embedded media is played (114).

Extracting Playback Guide Information

Figure 7:
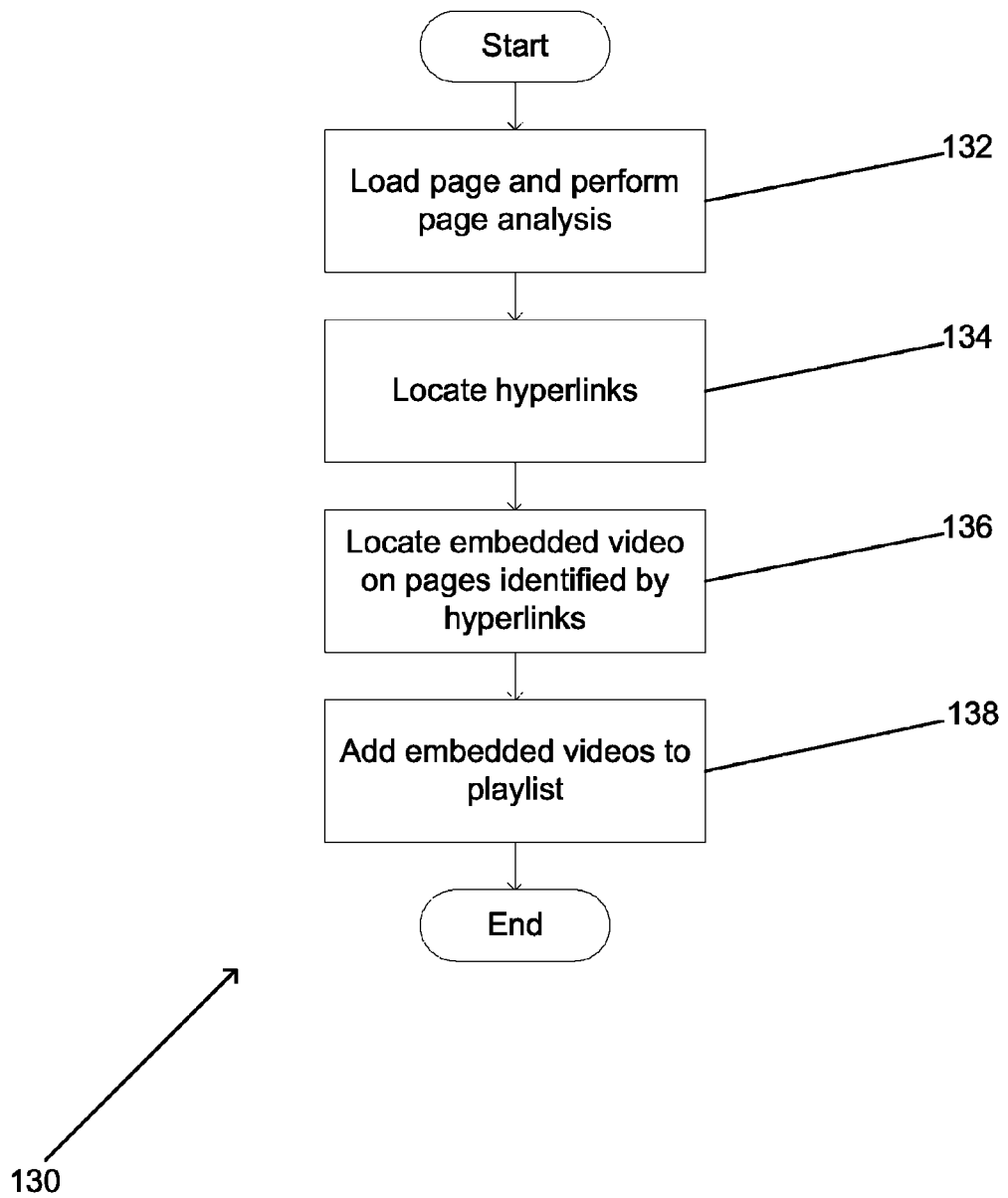
FIG. 7 is a flow chart showing a process for automatically generating a playlist from a page accessed via the Internet in accordance with an embodiment of the invention.

Generation of a playback guide involves extracting relevant information from pages downloaded via the Internet. A process for extracting information that can be used in the generation of a playback guide is shown in FIG. 7. The process 130 includes loading (132) a page and performing page analysis to locate relevant information within the page including media embedded on the page. As part of the page analysis, hyperlinks within the page are identified (136) and the hyperlinked pages are retrieved and analyzed to locate (136) embedded media and associated information. The located media are then added (138) to a playlist. In several embodiments, the media are added in the order presented on the source web page, from top to bottom. Both the information retrieved during page analysis and the playlist can be used in the generation of a playback guide in accordance with embodiments of the invention.

Figure 8:
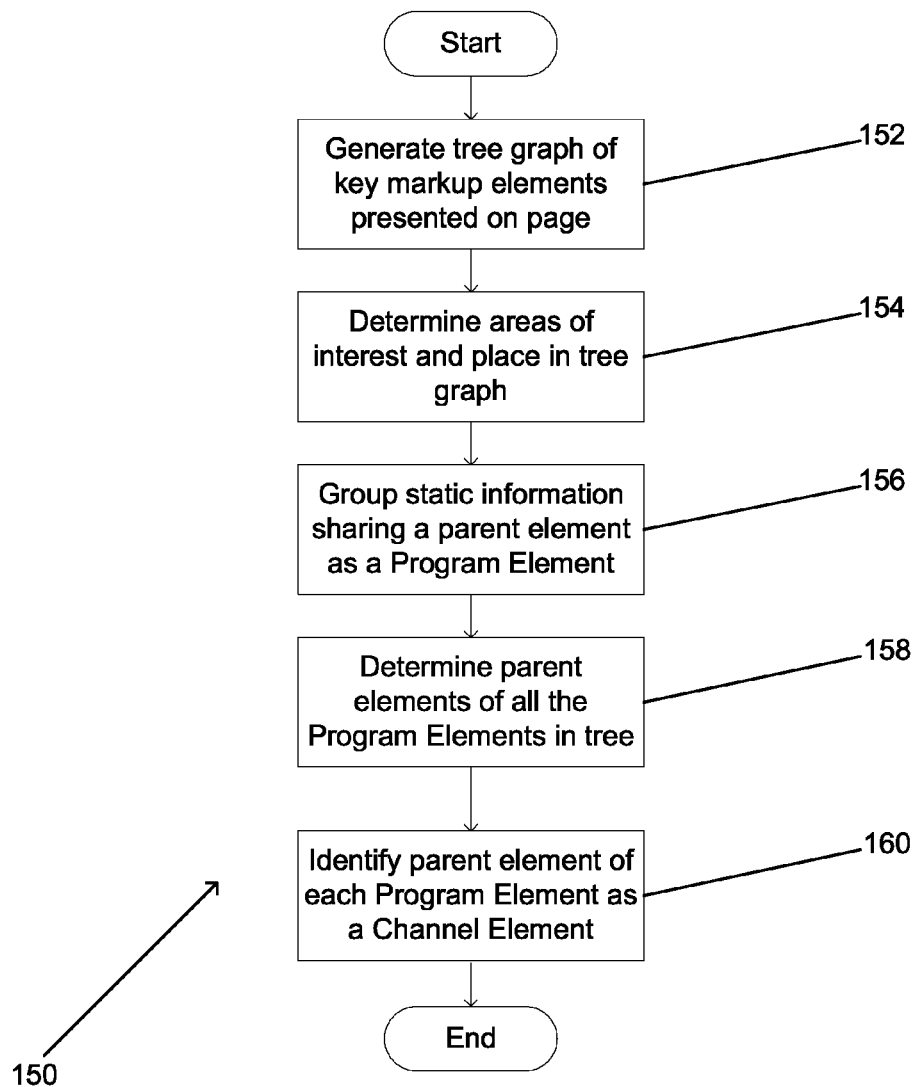
FIG. 8 is a flow chart showing a process for performing document analysis to identify media referenced by a page accessed via the Internet and to construct channels from the referenced media in accordance with an embodiment of the invention.

The process shown in FIG. 7 uses page analysis to collect information concerning embedded media. Page analysis also allows a system to obtain an understanding of how information on a page is visually organized. A page analysis process in accordance with an embodiment of the invention is shown in FIG. 8. The process 150 includes generating (152) a tree graph of key markup elements presented on the page in the memory of a computing device. Key elements are formatting elements within the page that are indicative of divisions between information. Examples of key markup elements include "div" elements in a CSS or "table" elements in an HTML page. Areas of interest are then determined (154) and added to the tree graph. Depending upon the application, areas of interest can include embedded media and/or links to pages that contain embedded media. The areas of interest typically depend upon the information that is to be displayed in the playback guide. The graph tree is then analyzed to locate static information and areas of interest that share a key element as a parent in the graph tree. The static information and the area of interest are then grouped as a Program Element. The graph is then further analyzed and key elements that are parents of a number of Program Elements are identified (160). The static information associated with each identified parent forms a Channel Element. Both the areas of interest and the static information associated with each Program Element and each Channel Element in the graph tree can then be used to construct a playback guide and populate a playlist with the program elements in the order they are visually presented in the original page(s) in accordance with an embodiment of the invention.

Figure 8A:
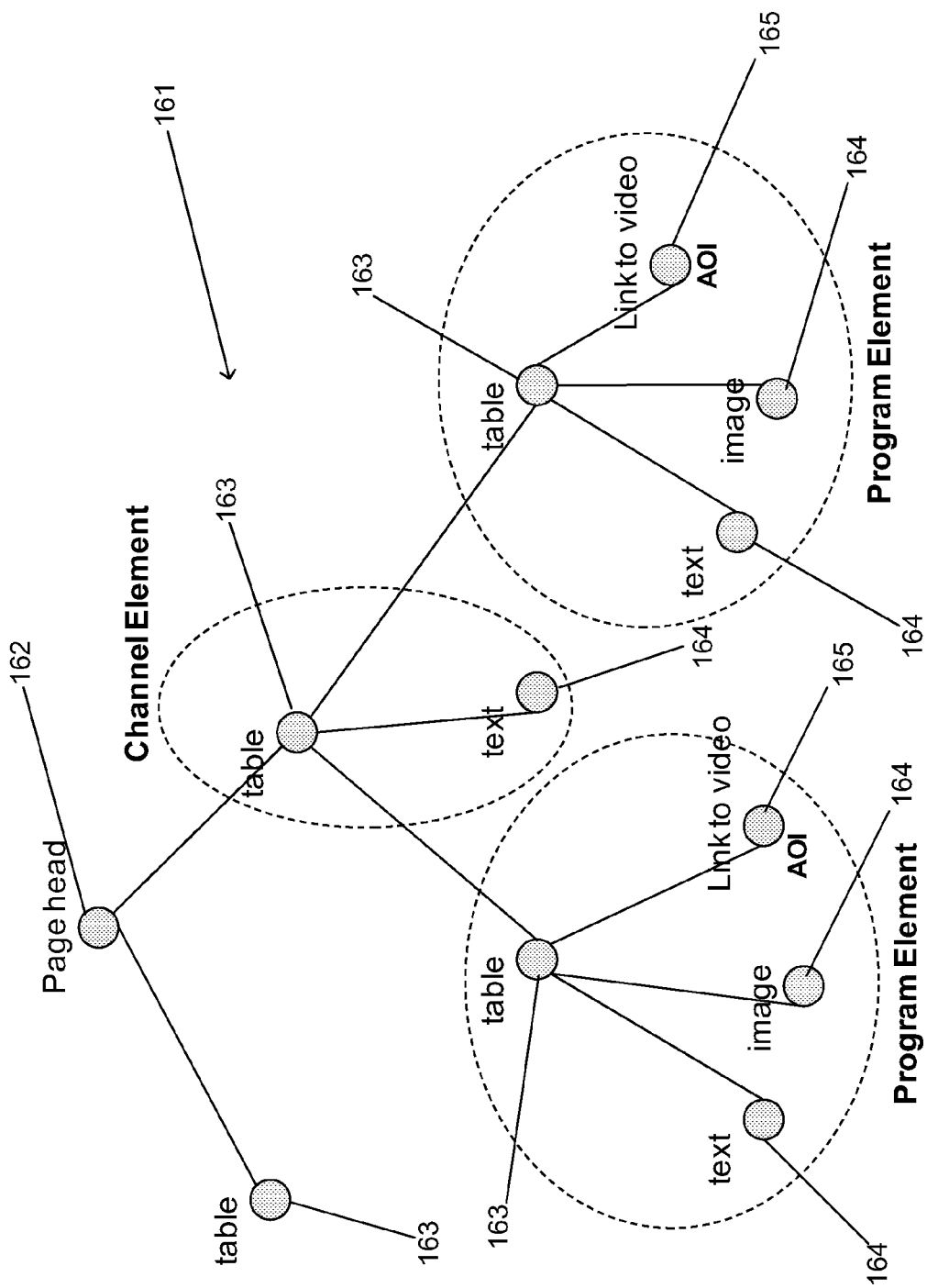
FIG. 8a is a conceptual illustration of a tree graph that could be generated from a web page using page analysis in accordance with an embodiment of the invention.

A tree graph constructed in accordance with an embodiment of the invention is shown in FIG. 8a. The tree graph 161 includes a page head element 162 that is connected to a pair of key markup elements 163, which in the illustrated embodiment are tables. Each key markup element 163 can be connected to a static element 164 (text and images in the illustrated embodiment), areas of interest 165 and/or other key elements 163. Each key markup element 163 that is connected to an area of interest forms a program element with the area of interest 165 and any static elements 164 that are also connected to the key element. In the illustrated embodiment, there are two program elements that connect to a single key markup element. When multiple program elements connect to a single parent key element, then the parent key markup element and any static elements connected to the parent key markup element form a channel element. As discussed above, the program elements can be added to the playlist and the channel element can be used to present program elements from a subset of the tree graph to the user via the playback guide.

Figure 9:
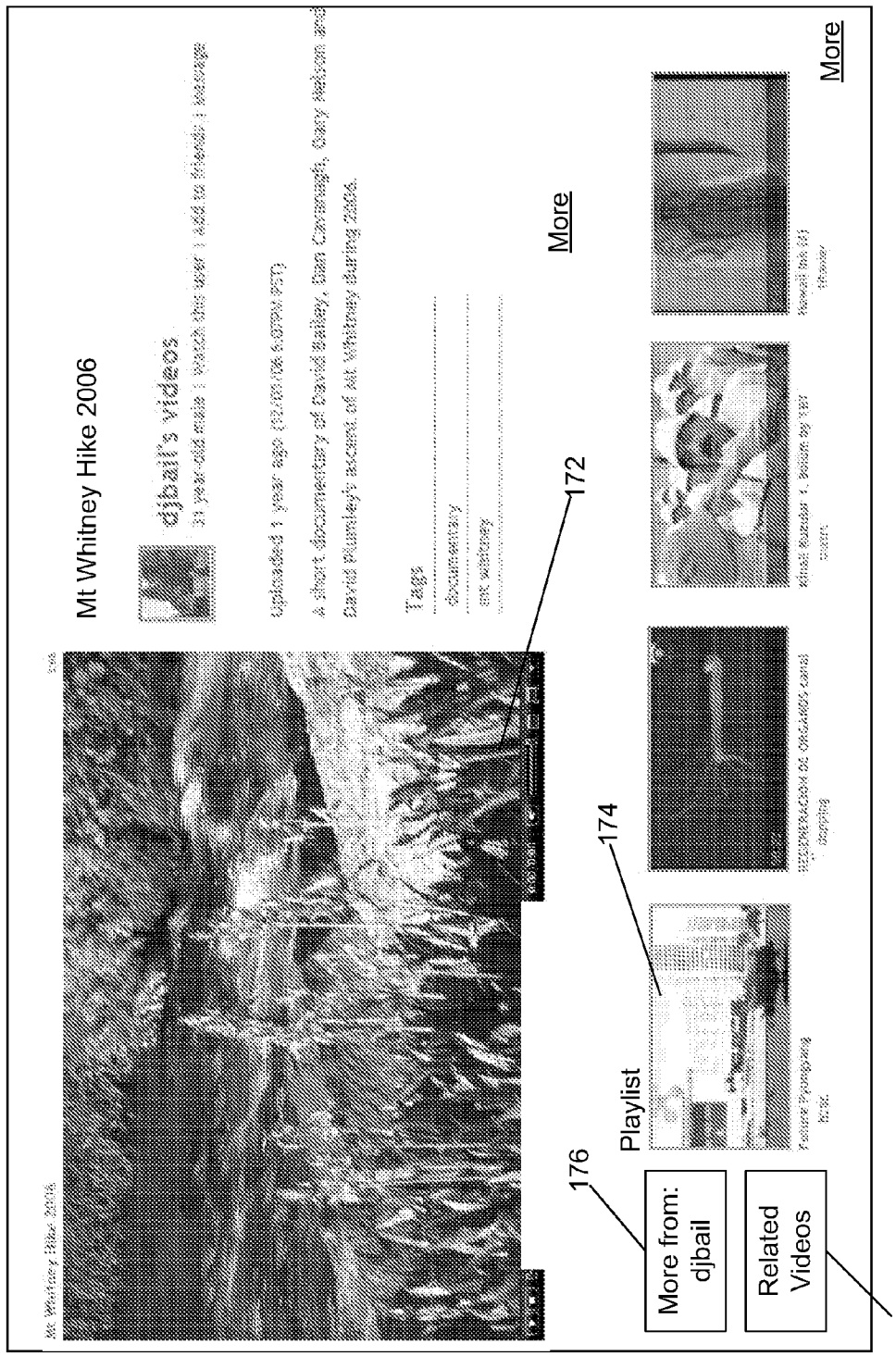
FIG. 9 is a conceptual illustration of a screen shot of a playback guide including channels in accordance with an embodiment of the invention.

By performing page analysis, a system in accordance with an embodiment of the invention can rearrange information provided by a site, such as a website, into a format more suitable for viewing via a television. A conceptual illustration of a playback guide that can be constructed by performing page analysis on the page shown in FIG. 2 in accordance with an embodiment of the invention is illustrated in FIG. 9. The playback guide 170 includes a window containing a screen shot of a video sequence and, in many embodiments, a player that enables playing of the video sequence. The playback guide 170 also includes a screen shots 174 from a number of video sequences queued in a playlist. In addition, the playback guide includes two channels. The first channel 176 is titled "More from: djbail" and can be used to navigate to a playback guide that contains more media from the user "djbail". The second channel 178 is titled "Related Videos" and can be used to navigate to a playback guide that contains additional related videos. The identification of channels during page analysis enables the creation of a playback guide that enables a user to filter the playlist that would otherwise be generated for a particular category of content. In a number of embodiments, the channels do not link to a separate playback guide. Instead the channels open windows that contain a playlist including media associated with the channel and the user can select the new playlist and/or a piece of media from within the new playlist. In several embodiments, the playblack guide includes messaging facilities that enable a user to send a piece of media to a contact either as a referral or in the form of an online greeting card or message. In many embodiments, a fee is automatically billed to the user for services provided via the playback guide. In a number of embodiments, media viewed via the playback guide is viewed on a pay-per-view basis and the user is automatically charged upon confirmation from the user that the user wishes to view pay-per-view content.

Although specific examples of systems and processes are described above for generating playlists and/or playback guides, any number of different processes can be used to identify media and static information from within pages and to reformat the information to accompany a playlist of media for viewing on a television set.

Navigating within a Playlist

Figure 10:
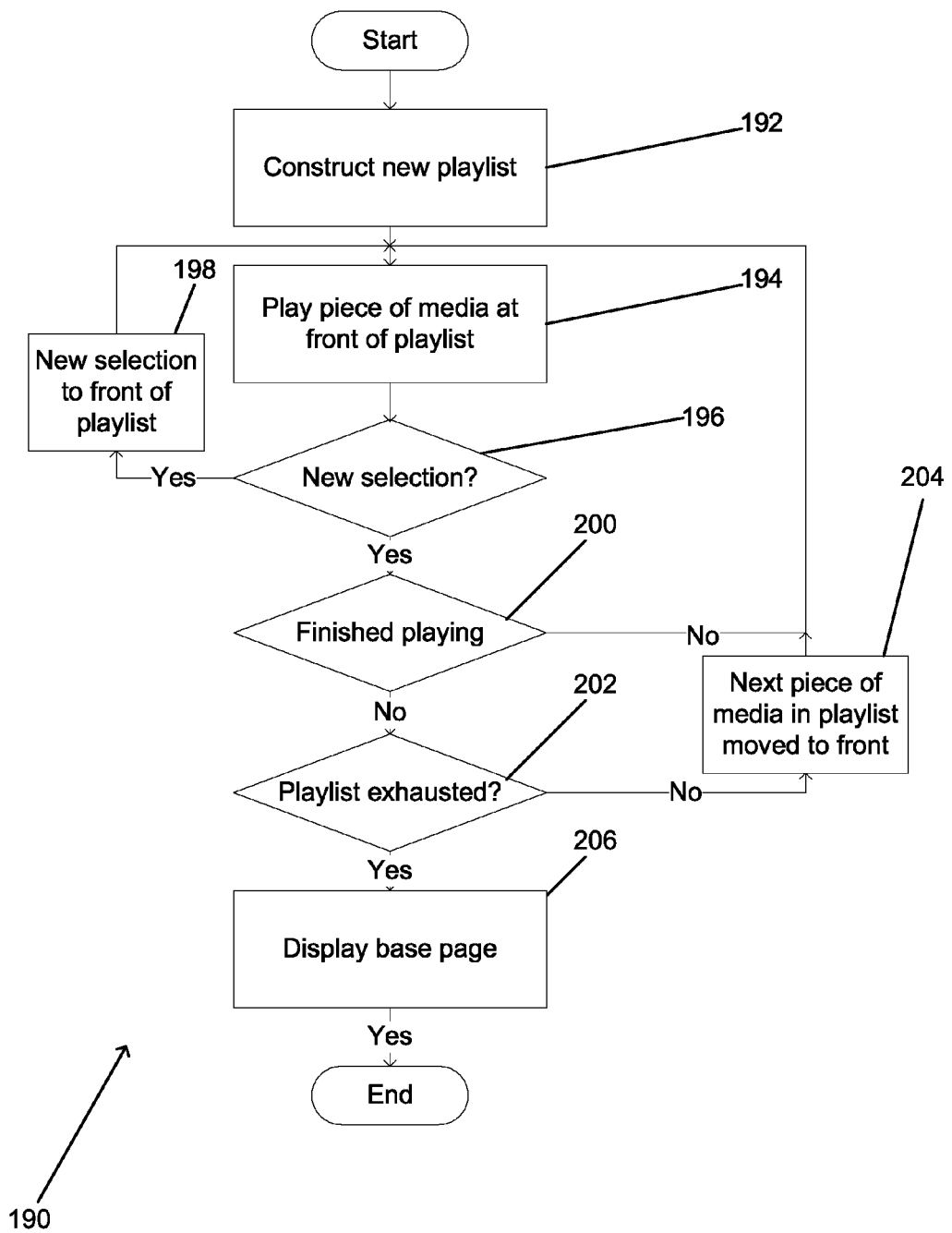
FIG. 10 is a flow chart showing a process for responding to user instructions relating to the playing of a piece of media in a playlist.

A playlist is part of many embodiments of the invention. The playlist enables a user to experience one piece of media after another without having to provide instructions to the system. In addition to experiencing media sequentially, the playlist enables skipping between pieces of media. A process for playing through a playlist and responding to user instructions in accordance with an embodiment of the invention is shown in FIG. 10. The process 190 commences when a user navigates to a new base page. A new playlist is constructed (192) and the first piece of media in the playlist commences playing (194). The process checks (196) for user instructions to select a new piece of media. The instruction may be in the form of an instruction to skip to the next piece of media forward or backward in the playlist. Alternatively, the instruction may be in the form of an instruction to select a piece of media out of sequence in the playlist using the playback guide. When a new piece of media is selected, the new piece of media is placed (198) at the front of the playlist. In many embodiments, the selection of a piece of media out of sequence results in the page from which the selected piece of media was extracted becoming the base page and page analysis is performed to add new pieces of media to the playlist. In several embodiments, the playlist is flushed and the new pieces of media from the base page are added to the playlist. In other embodiments, the new pieces of media are amended to the playlist. In several embodiments, the user can set whether or not page analysis is performed and/or whether the playlist is flushed. When no user instructions are received, the process determines (200) whether the piece of media being played has finished playing. When a piece of media has finished playing, then a determination (202) is made as to whether there are any additional pieces of media in the playlist. In the event that there are additional pieces of media, then the next piece of media in the playlist is moved (204) to the front of the playlist. When the playlist is exhausted, the currently selected base page is displayed (206).

Although a specific process is outlined above for responding to user instructions, other processes in accordance with embodiments of the invention can be used to handle the playing of media from a playlist generated by page analysis in response to user instructions. In many embodiments, the process used to respond to user instructions depends upon the requirements of users in a specific application.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A system for playback of media obtained via the Internet, comprising:
   a server connected to a network, where the server hosts at least one page of information including embedded media; and
   a computing device connected to the network and to a display device, where the display device is separate from the computing device and configured to receive instructions from a remote control device;
   wherein a browser application configures the computing device to retrieve a page hosted on the server;
   wherein the browsing application further configures the computing device to perform page analysis;
   wherein page analysis comprises:
      identifying hyperlinks within the page;
      inspecting the hyperlinks to identify embedded media;
      adding the embedded media to a playlist;
      generating a tree graph of key markup elements present on the page;
      determining areas of interest and static information and adding the areas of interest and static information to the tree graph;
      analyzing the graph tree to locate static information and areas of interest that share a key markup element as a parent in the graph tree;
      grouping the static information and the area of interest as a program element;
      analyzing the tree graph to identify a key markup element that is a parent of a number of program elements; and
      assigning the identified key markup elements as a channel element and adding the program elements to a playlist associated with the channel element; and
      adding each channel element to the playlist; and
   wherein the browsing application further configures the computing device to generate a playback guide user interface in which the playlist of media is displayed, and to display the generated playback guide via the display device, where the generated playback guide is formatted for the display device and for navigation using the remote control device.

2. The system of claim 1, wherein the browsing application further configures the computing device to generate a playback guide user interface displaying the playlist and the option to display the playlist associated with the channel element.

3. The system of claim 1, wherein the media objects are inserted in the play list in the order in which they appear in the page.

4. The system of claim 1, wherein key markup elements include "div" elements in a CSS.

5. The system of claim 1, wherein key markup elements include "table" elements in an HTML page.

6. The system of claim 1, wherein an area of interest includes embedded media.

7. The system of claim 1, wherein an area of interest includes a link to a page that contains embedded media.

8. The system of claim 1, wherein static information includes text.

9. The system of claim 1, wherein static information includes an image.

10. The system of claim 1, wherein the computing device is a personal computer.

11. The system of claim 1, wherein the computing device is a set top box.

12. The system of claim 1, wherein the computing device is embedded within the display device.

13. The system of claim 1, wherein the browsing application further configures the computing device to update the playback guide user interface in response to navigation instructions received from the remote control and forwarded to the computing device by the display device.

14. The system of claim 1, wherein the browsing application further configures the computing device to playback media using a media player in response to navigation instructions received from the remote control and forward to the computing device by the display device.

15. The system of claim 1, wherein the browsing application further configures the computing device to display the entire page retrieved from the server via the display device and configures the computing device to display the playback guide via the display device in response to navigation instructions received from the remote control and forwarded to the computing device by the display device.

16. The system of claim 1, wherein:
   the browser application configures the computing device to retrieve multiple pages hosted on at least one server;
   the browsing application further configures the computing device to perform page analysis on each of the retrieved pages, where page analysis includes identifying hyperlinks within each page, inspecting the hyperlinks to identify embedded media, and adding the embedded media to a playlist; and
   the browsing application further configures the computing device to generate a playback guide user interface in which the playlist of media from the retrieved pages is displayed, and to display the generated playback guide via the display device.

17. The system of claim 16, wherein the browser application selects the multiple pages to retrieve based upon hyperlinks in previously retrieved pages.

* * * * *